US009722810B2

(12) United States Patent
Basso et al.

(10) Patent No.: US 9,722,810 B2
(45) Date of Patent: Aug. 1, 2017

(54) COMPUTER-BASED FLOW SYNCHRONIZATION FOR EFFICIENT MULTICAST FORWARDING FOR PRODUCTS AND SERVICES

(71) Applicant: International Business Machines Corporation, Armonk, NY (US)

(72) Inventors: Claude Basso, Nice (FR); Nikolaos Chrysos, Thalwil (CH); Cyriel Minkenberg, Gutenswil (CH); David A. Shedivy, Rochester, MN (US); Kenneth M. Valk, Rochester, MN (US); Brian T. Vanderpool, Byron, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 366 days.

(21) Appl. No.: 14/171,015

(22) Filed: Feb. 3, 2014

(65) Prior Publication Data
US 2015/0222443 A1     Aug. 6, 2015

(51) Int. Cl.
*H04L 12/26*     (2006.01)
*H04L 12/18*     (2006.01)
(Continued)

(52) U.S. Cl.
CPC .......... *H04L 12/1881* (2013.01); *H04L 47/29* (2013.01); *H04L 47/32* (2013.01)

(58) Field of Classification Search
None
See application file for complete search history.

(56) References Cited

U.S. PATENT DOCUMENTS 6,560,237 B1 * 5/2003 Hiscock .................. H04L 47/34
                                                370/390
6,757,284 B1 * 6/2004 Galles .................... H04L 49/552
                                                370/394

(Continued)

OTHER PUBLICATIONS

B. Prabhakar, et al, "Multicast Scheduling for Input Queued Switches," IEEE Journal on Selected Areas in Communications, vol. 15, No. 5, Jun. 1997; pp. 855-866.

*Primary Examiner* — Kwang B Yao
*Assistant Examiner* — Hardikkumar Patel
(74) *Attorney, Agent, or Firm* — Cantor Colburn LLP; Daniel Morris

(57) ABSTRACT

A method for synchronizing multicast message subflows in a switched network includes associating, with a processing device, a first destination identifier corresponding to a multicast message with a first queue that corresponds to a first output port of a switching device, associating, with a processing device, a second destination identifier corresponding to the multicast message with a second queue that corresponds to a second output port of the switching device, pausing the first queue in response to a message counter corresponding to the first queue crossing a first predetermined threshold, and unpausing the first queue in response to the message counter crossing a second predetermined threshold, wherein the message counter indicates a quantity of data that has been forwarded by the first queue but remains to be forwarded by the second queue.

20 Claims, 7 Drawing Sheets

(51) Int. Cl.
*H04L 12/801* (2013.01)
*H04L 12/823* (2013.01)

(56) References Cited

U.S. PATENT DOCUMENTS

| | | | |
|---|---|---|---|
| 8,432,908 B2 | 4/2013 | Li et al. | |
| 8,605,722 B1 * | 12/2013 | Sindhu | H04L 45/16 370/390 |
| 9,201,605 B2 * | 12/2015 | Akirav | G06F 11/1453 |
| 2004/0017810 A1 * | 1/2004 | Anderson | H04L 47/15 370/390 |
| 2004/0179476 A1 * | 9/2004 | Kim | H04L 12/40143 370/230 |
| 2011/0085464 A1 * | 4/2011 | Nordmark | H04L 49/101 370/252 |
| 2013/0128896 A1 | 5/2013 | Munoz | |
| 2014/0207986 A1 * | 7/2014 | Guok | G06F 12/00 710/110 |

* cited by examiner

COMPUTER-BASED FLOW SYNCHRONIZATION FOR EFFICIENT MULTICAST FORWARDING FOR PRODUCTS AND SERVICES

BACKGROUND

The present invention relates generally to network switching, and more specifically, to synchronizing multiple virtual output queue flows to facilitate efficient multicast message forwarding.

Efficient support of multicast traffic by switches and routers has become increasingly important, including for applications such as video or other content broadcasting, ticket distribution in financial markets, disaster recovery, and distributed multimedia systems. Various solutions have been developed in this regard.

In fanout splitting, an input generally sends a separate copy of the packet payload to each destination. However, if the same packet is granted by multiple destinations at the same time, then the input may send a single copy to that group of destinations, but additional copies of the payload must be sent for remaining destinations.

In pure non-fanout splitting, an input generally transmits the payload of each packet, together with a list of the targeted destinations, only once when all destinations are able receive the packet. In this type of multicast packet switching protocol, the switch is responsible to replicate the payload to all of its destinations. Thus, the switch fabric makes new copies of the payload only where destinations diverge, in an attempt to save bandwidth by transferring a packet's payload only once on the common links of the path segments that are shared by all destinations.

Scheduling solutions are available that use request-grant schemes. In order to transmit a message, the hosting queue must first issue a request and receive a grant. Solutions are available that maintain a single first-in-first-out (FIFO) queue at each input to store arriving multicast messages as they await a grant. However, such FIFO systems may experience severe performance problems due to head of line (HOL) blocking when a grant is delayed. The time it takes for a queue to receive the grant may depend on the demand level at the targeted destination, as well as the physical distance between the input port and the location of the arbiter.

Thus, virtual output queues (VOQs), each corresponding to a different output port, may be implemented. However, non-fanout splitting solutions cannot be easily implemented in virtual output queue systems. Different queues may experience different request-grant propagation delays. Generally, in order for a non-fanout splitting injection occur, all corresponding packet copies must be located at the HOL position of their queue, and all packet copies must hold grants/credits from the corresponding destination arbiter.

SUMMARY

According to one embodiment of the present invention, a method for synchronizing multicast message subflows in a switched network includes associating, with a processing device, a first destination identifier corresponding to a multicast message with a first queue that corresponds to a first output port of a switching device, associating, with a processing device, a second destination identifier corresponding to the multicast message with a second queue that corresponds to a second output port of the switching device, pausing the first queue in response to a message counter corresponding to the first queue crossing a first predetermined threshold, and unpausing the first queue in response to the message counter crossing a second predetermined threshold, wherein the message counter indicates a quantity of data that has been forwarded by the first queue but remains to be forwarded by the second queue.

According to another embodiment of the present invention, a system for synchronizing multicast message subflows in a switched network includes a switching device configured to associate a first destination identifier corresponding to a multicast message with a first queue that corresponds to a first output port of a switching device and a second destination identifier corresponding to the multicast message with a second queue that corresponds to a second output port of the switching device, and a subflow controller configured to pause the first queue in response to a message counter corresponding to the first queue crossing a first predetermined threshold, and to unpause the first queue in response to the message counter crossing a second predetermined threshold, wherein the message counter indicates a quantity of data that has been forwarded by the first queue but remains to be forwarded by the second queue.

According to yet another embodiment of the present invention, a computer program product for synchronizing multicast message subflows in a switched network includes a computer readable storage medium having program code embodied therewith, the program code executable by a computer to implement associating a first destination identifier corresponding to a multicast message with a first queue that corresponds to a first output port of a switching device, associating, with a processing device, a second destination identifier corresponding to the multicast message with a second queue that corresponds to a second output port of the switching device, pausing the first queue in response to a message counter corresponding to the first queue crossing a first predetermined threshold; and unpausing the first queue in response to the message counter crossing a second predetermined threshold, wherein the message counter indicates a quantity of data that has been forwarded by the first queue but remains to be forwarded by the second queue.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
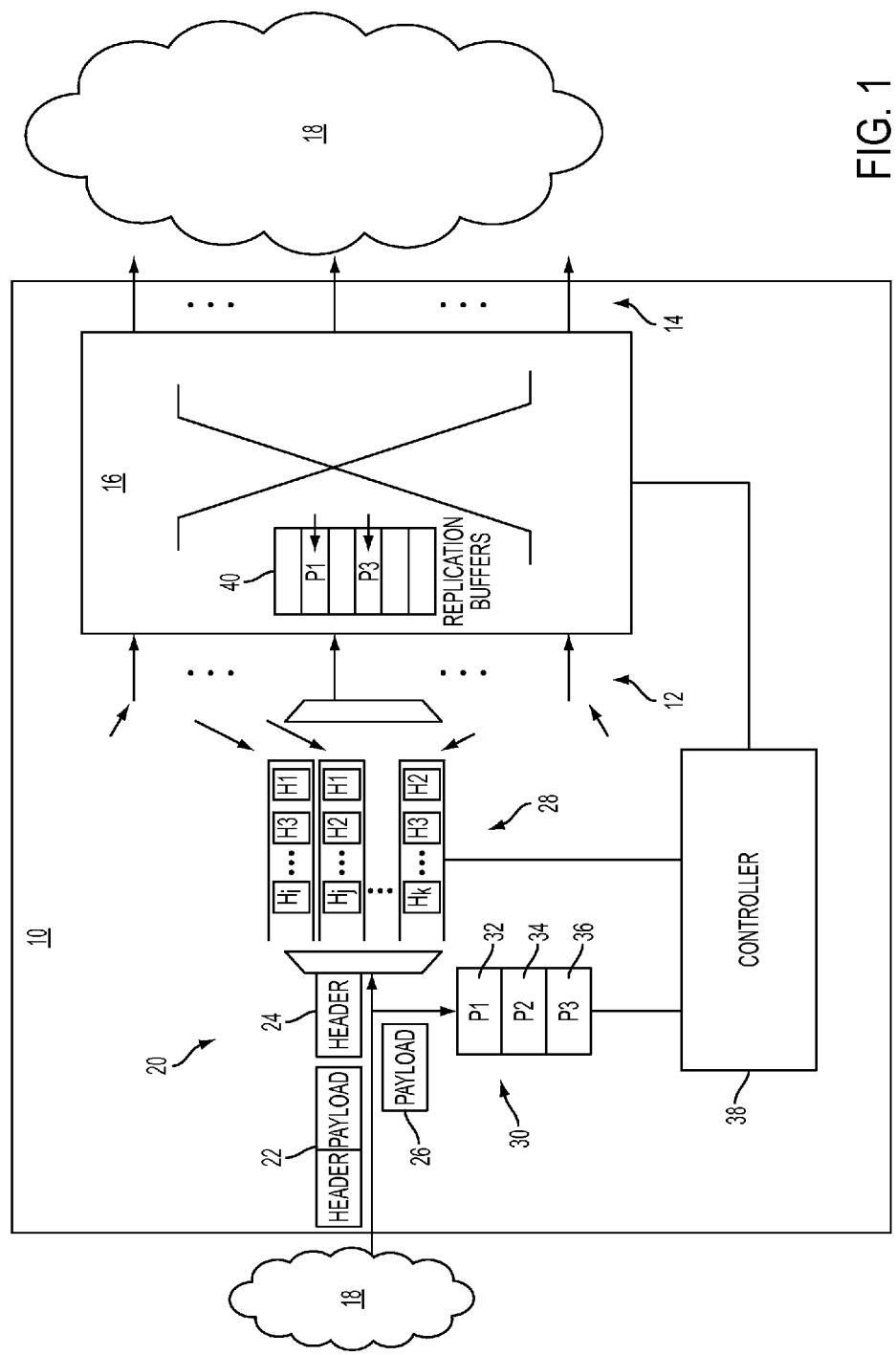
FIG. 1 is a schematic diagram of a switching device in accordance with an embodiment of the invention.

An embodiment of the present invention may include a system for multicast packet network switching. The switching fabric may be configured to internally store payload data from a number of network packets. As a result, copies of a network packet may be sent to multiple destinations by providing to the switch fabric the corresponding header information, including the multicast destination addresses, or fanout set. Upon receiving the header information, the switch fabric may efficiently forward the respective stored payload to the destinations indicated by the respective header information.

A fanout set is the set of destinations of a multicast message, and a multicast flow is the resulting group of messages to all destinations of a multicast message. A subflow is a subset of a multicast flow targeting a single destination or output port. A subflow queue holds messages from multiple multicast subflows targeting the same destination or output port.

In an embodiment, a multicast packet network switching system may maintain an input buffer at each input with individual subflow queues for each destination in the multicast fanout set or for each output port corresponding to the destinations in the multicast fanout set. For example, subflow queues may be implemented using content addressable memory (CAM). In addition, the multicast packet network switching system may maintain a message payload replication cache at each input. The payload from each multicast message may be stored in one or more entries in the replication buffer, and a pointer may be stored with the message header information that points to the message payload location. Thus, only a single copy of each multicast message payload is stored at a single memory location while the multicast message is processed, and a copy of the payload is made each time the message is forwarded to a destination or output port. This type of multicast configuration may alleviate much of the cost of such transmissions, for example, in terms of required memory space.

In an embodiment, a multicast message may be written once to a memory location, including one or more buffer units, to avoid having to write the payload of a multicast message into memory for each destination. A separate multicast header structure may be allocated for each destination of the multicast message and placed in a subflow queue, or virtual output queue (VOQ), that corresponds to the destination output port. Each such multicast header may include at least a pointer to the memory location of the corresponding payload, as well as routing and control information, such as the targeted destination, priority level, etc.

In an embodiment, the message payload buffers may be located in the switching fabric or on the switching device chip. In various embodiments, the switching fabric may include message payload buffers corresponding to each input port, or a single set of message payload buffers that stores payloads from multicast messages being processed by all the input ports. This type of multicast configuration has the advantage that a copy of each multicast message payload may be forwarded from an input port to the switching fabric, or switching device, in many cases only once, or in general, fewer times than the number of multicast destinations indicated in the message header. This approach is flexible enough, and can also save a lot of bandwidth, by avoiding having to inject the same payload multiple times over the interface to the fabric.

It should be understood that a subflow queue may include header information from more than one multicast message. Thus, a multicast message subflow generally forms part of a subflow queue, which may contain header information regarding all multicast messages currently being forwarded to the same destination or via the same output port. While this distinction in the use of the term "subflow" sometimes is not relevant (for example, when a subflow queue is blocked, each corresponding multicast message subflow also is blocked), the specific meaning generally may be determined in context.

In addition, in an embodiment, each subflow queue may operate on a first-in-first-out (FIFO) basis. This scheme does not suffer from deadlocks, that is, a cyclic dependency where all subflow queues are blocked or paused, and each subflow queue in turn awaits another subflow queue that is blocked or paused.

Referring now to FIG. 1, an embodiment of the present invention may include a switching device 10 having one or more input ports 12 and one or more output ports 14. The switching device 10 may include any appropriate digital switching fabric 16 known in the art, such as a crossbar switch, a buffered crossbar switch, a shared memory switch, or the like. In an embodiment, the switching device 10 may implement switching fabric 16 controlled by a variable-delay request-grant protocol. The switching device may implement a scalable, distributed, multicast forwarding scheme, wherein independent per destination arbiters grant the requesting subflow queue requests. An alternative embodiment may implement a centralized resolution scheme, wherein the grants may be computed centrally.

The input ports 12 and output ports 14 may be communicatively connected to at least one communication network 18. For example, in any embodiment, the network 18 may be implemented using any type or combination of known communications networking devices, including but not limited to, a local area network (LAN), a wide area network (WAN), an Ethernet, a ring network, a start network, an intranet, the Internet, a global network, a virtual private network (VPN), and a public switched telephone network (PSTN), a private branch exchange (PBX), a cellular telephone network, or the like. In any embodiment, any portion or all of the data network 18 may be implemented using physical connections, radio frequency or wireless technology. A person of ordinary skill in the art will readily apprehend that any combination of numerous existing or future communication network technologies may be implemented in association with an embodiment of the invention.

The switching device 10 may be configured to receive network messages, such as Internet protocol messages, from the network 16 by way of the input ports 12, and to send network messages to into the network 16 via the output ports 14. The switching fabric 16 may direct the message data from the receiving input port 12 to the output port or ports 14 connected to the designated destination network node or nodes.

A representative input port 20 is illustrated in greater detail. Network messages, such as the exemplary multicast network message 22, may be received by the input port 20 from the communication network 18. The message header information 24, including the designated destinations to which the packet is to be sent, may be separated from the message payload data 26. The header information 24 may include a pointer to the payload data 26. The header information 24 may be placed in one or more multicast subflow queues 28, or virtual output queues (VOQs), each of which may corresponds to one of the output ports 14. The header information 24 may be placed in each of the subflow queues 28 that correspond to one or more of the destination network nodes designated in the message. An individual subflow queue may host all messages originating from different multicast flows that target a specific destination or output port 14.

The payload data 26 may be stored in an input replication cache 30 that maintains copies of the payloads from each multicast message that currently is being processed by the switching device 10. The header information 24 may include a pointer to the location, for example, the head memory address, where the payload data 26 is stored in the replication cache 30. A person of ordinary skill in the art will understand that the network message 22 may consist of more than one network packets, each of which includes the message header information 24 and only a portion of the message payload data 26. Thus, in various embodiments, the replication cache entries 32, 34, 36, represented in FIG. 1 as P1, P2 and P3, respectively, may each contain a complete message payload or only a portion of a message payload. Thus, as used in this disclosure, the term "message" generally may include a packet, a segment, a frame, a datagram or the like.

In an embodiment, the header information 24 may be maintained in one or more subflow queues 28 until the header information 24 is forwarded to the switching fabric 16 and sent along with the corresponding payload data 26 to one or more destination network nodes in the network 18. Each subflow queue 28, may correspond to an individual destination or output port 14 of the switching device 10. Each of the subflow queues 28 may be ordered and operated in a first-in-first-out (FIFO) manner. A multiplexer may combine data from the various subflow queues 28 into a single input data stream at the switching device 10.

Thus, the header information 24 from a particular message may be held in more than one subflow queue 28 and forwarded to the switching fabric 16 at different times to be sent via the corresponding output ports 14 upon reaching the head of line (HOL) position of each of the subflow queues 28. A person of ordinary skill in the art will understand that the specific header information stored in in the various subflow queues 28 may include only a portion of the complete message header information 24, for example, the destination or destinations connected to the switching device 10 by way of the output port 14 corresponding to the individual subflow queues 28. A controller 38 may be linked to the switching device 10 to control the operations of the input ports 12, the switching fabric 16 and the output ports 14.

In an embodiment, a set of payload replication buffers 40 may be included in the switching fabric 16. The replication buffers 40 may store copies of the payload data 26 from multiple multicast messages that are currently being processed by the switching device, such that a copy can be sent to an additional destination by forwarding the corresponding header information inside the fabric, and letting the fabric forward the stored payload to the destination identifier. The header information 24 may include a pointer to the location, for example, the head memory address, where the payload data 26 is stored in the replication buffers 40. Since the replication buffers 40 are located in the switching fabric 16 of the switching device 10, the payload data 26 may need to be forwarded to the switching fabric 16 only once for each message 22.

When a new subflow becomes active at an input, the message payload may be stored in the replication buffers 40. If all units of the replication buffers 40 contain valid entries, the replication buffers 40 may overflow, causing the message payload to replace the oldest valid cache entry. As long as the payload data 26 for a particular message 22 is retained in the replication buffers 40, a copy of the message payload data 26 may be replicated from the replication buffers 40 each time the corresponding message header information 24 is forwarded to the switching fabric 16.

For example, the message payload data 24 may be forwarded to the switching fabric 16 at the time that the first of the subflow queues 28 containing the header information 24 forwards the corresponding header information 24 to the switching fabric 16. The payload data 26 may be copied to the replication buffers 40 and sent through the switching fabric 16 to the output port 14 corresponding to the header information 24. When other subflow queues 28 subsequently forward the header information 24 to the switching fabric 16, the payload data 26 may be replicated from the replication buffers 40 instead of being redundantly forwarded from the input port 20.

Of course, the replication buffers 40 have a finite number of entries. As a result, the payload data 26 of a particular message eventually will be overwritten in the replication buffers 40 once the amount of payload data 26 from additional messages equals the capacity of the replication buffers 40. Thus, the payload data 26 from a particular message may no longer be available in the replication buffers 40 when corresponding header information 24 is forwarded to the switching fabric 16, in the case that the time elapsed after the payload data 26 was first forwarded to the switching fabric 16 has been sufficient that the quantity of additional payload data 26 has caused the replication buffers 40 to overflow.

As a result, in order to take full advantage of the benefit of the replication buffers 40, the subflow queues 28 for all destinations of a multicast message must progress in relatively close synchronization with one another. While one subflow queue may be allowed to run ahead of the others, thus avoiding the HOL blocking of FIFO systems, approximate synchronization disallows any subflow queue from running too far ahead of the others, so as to allow the fabric to internally replicate messages more efficiently. An embodiment of the present invention may provide flow synchronization among the subflows of a multicast message fanout set in an attempt to avoid or prevent such a replication buffer overflow.

In an embodiment, the number of packets that an individual multicast subflow queue may be allowed to send ahead of any other subflow in the fanout set may be limited to an acceptable range, based on the capacity of the replication buffer memory. A subflow counter may be incremented each time the respective subflow forwards a message to a destination, and decremented each time all subflows in the fanout set have forwarded at least one message apiece. A subflow may be suspended, or paused, whenever the subflow counter crosses through a high threshold moving upward, and permitted to forward messages, or unpaused, whenever the subflow counter crosses through a low threshold moving downward. As a practical matter, in an embodiment, the low threshold may be greater than the quantity of data held in largest message payload frame used in the system, and the high threshold may be less than the total memory capacity of the replication buffers 40.

Figure 2:
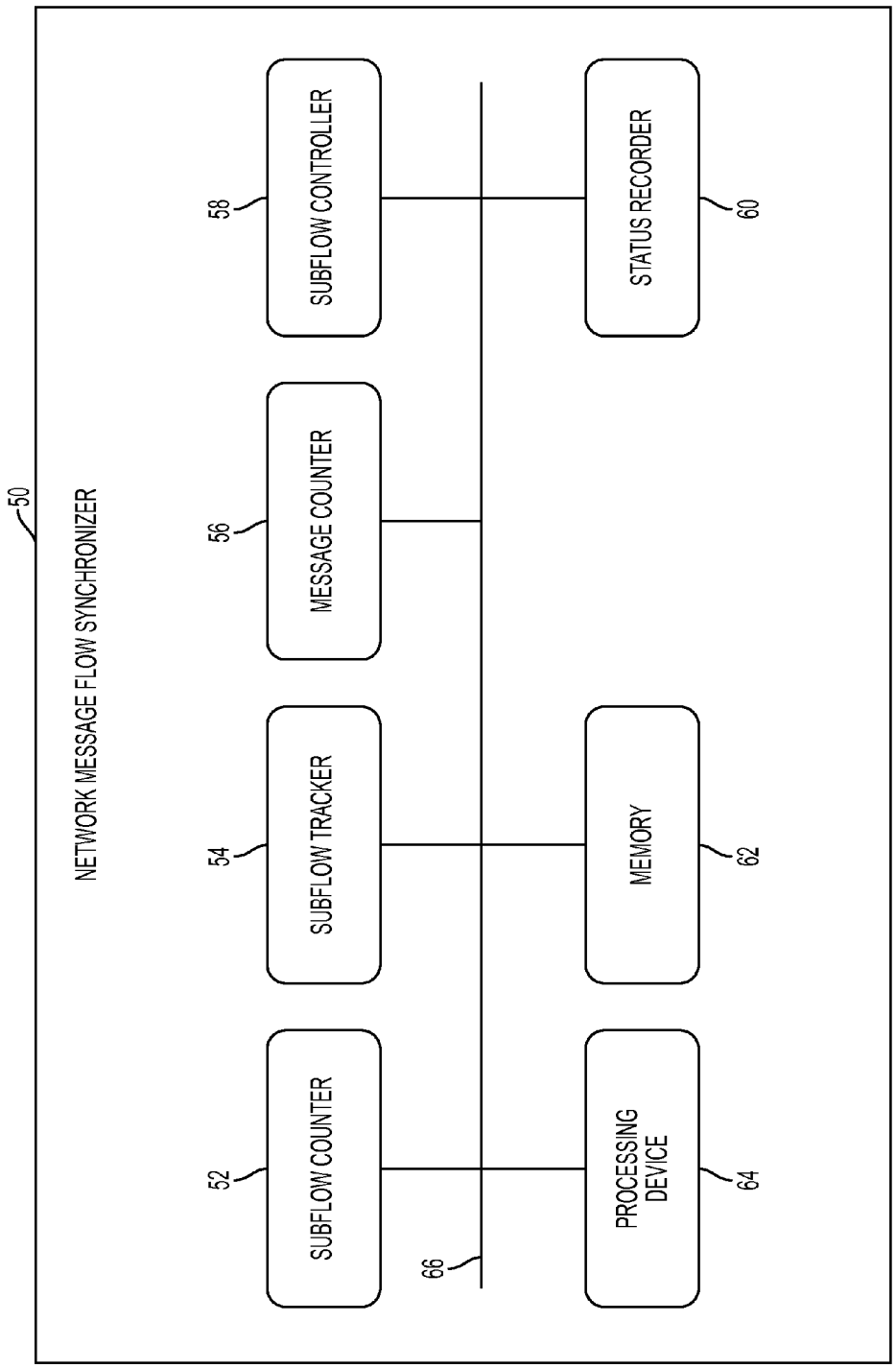
FIG. 2 is a block diagram of a network message flow synchronizer in accordance with an embodiment of the invention.

With reference now to FIG. 2, an embodiment of the present invention may provide a network message flow synchronizer 50 including a subflow counter 52, a subflow tracker 54, a message counter 56, a subflow controller 58 and a status recorder 60, stored in a memory 62 and implemented by a processing device 64, all of which may be connected by data links 66. The network message flow synchronizer 50 may be communicatively coupled to a switching device, such as the switching device 10 of FIG. 1. The network message flow synchronizer 50 may monitor and control the flow of messages through the input ports 12 to maintain substantial synchronization of multiple subflows corresponding to the various destination identifiers, or addresses, of a multicast message. In an embodiment, the memory 62 may be integral to a switching device interface.

The subflow counter 52 may include a reference count variable corresponding to each multicast message payload that is currently being processed. The subflow counter 52 may maintain the current number of subflows at any time that remain to send the corresponding message payload. The subflow counter 52 may initialize the reference count variable to the number of destination identifiers in the corresponding multicast message header, or to the number of subflows, or virtual output queues (VOQs), that will need to forward the message payload.

The subflow counter 52 may adjust, or decrement, the reference count variable each time a subflow forwards the corresponding message, that is, each time a subflow forwards header information from the corresponding message to the switching device and the message payload is sent via the corresponding output port. In an embodiment, the subflow counter 52 may store a pointer that indicates the storage location of the subflow tracker entry corresponding to the message.

The subflow tracker 54 may include a connection count variable corresponding to each multicast message payload that is currently being processed. The subflow tracker 54 may maintain the number of destinations, or output ports, to which each message payload has been forwarded in the connection count variable. The subflow tracker 54 may also maintain a list of destinations to which the message payload has been sent at any time. In an embodiment, the subflow tracker 54 may store the size of the message payload, for example, the number bits, bytes, words, packets or buffer entries needed to hold the message payload.

The message counter 56 may include a number-ahead variable corresponding to each subflow queue, or VOQ. The message counter 56 may maintain the current number of messages, or quantity of data, the corresponding subflow queue has sent in advance of any other subflow queue currently processing a common multicast message. That is, the message counter 56 maintains the greatest difference at any time between the number of messages or quantity of data sent by the corresponding subflow and the number of messages or quantity of data sent by any other subflow with one or more common multicast messages that currently lags the corresponding subflow.

The message counter 56 may increment the number-ahead variable corresponding to a subflow each time the corresponding subflow forwards a message, for example, each time the subflow forwards header information from a message to the switching device or switch fabric and the corresponding message payload is sent via the corresponding output port. On the other hand, each time the reference-count variable of a multicast message that is being processed reaches zero, the message counter 56 may decrement the number-ahead variables of all subflow queues that included the corresponding message header information.

In various embodiments, the message counter 56 may be implemented to reflect the number of message payloads, replication buffer entries, words, bytes, bits or any other appropriate representation of the amount of data that has been forwarded by the corresponding subflow in advance of another subflow currently processing a common multicast message.

The subflow controller 58 may pause, or inactivate, a subflow queue from sending multicast messages while any remaining subflow queue that also holds header information from the same multicast messages lags too far behind. In particular, if after being incremented the number-ahead variable of a particular subflow queue exceeds a predetermined upper threshold, then the subflow queue may be paused so that it cannot forward multicast messages. The upper threshold may indicate a number of message payloads, replication buffer entries, words, bytes, bits or any other appropriate representation of the corresponding amount of data. In this manner, the discrepancy in data sent by subflow queues with respect to a given multicast message may be limited, for example, to the amount of data that may be stored in a replication buffer at an input port or to a predetermined fraction of the amount of data that may be stored in a set of replication buffers in the switching fabric.

On the contrary, the subflow controller 58 may activate, or unpause, a subflow queue, allowing the subflow queue to once again send multicast messages after all remaining subflow queues that also hold header information from the same multicast messages have caught up with the subflow queue or are found within an acceptable range of the subflow queue. In particular, if after being decremented the number-ahead variable of a particular subflow queue is less than a predetermined lower threshold, then the subflow queue may be reactivated and allowed to once again forward multicast messages. The lower threshold may indicate a number of message payloads, replication buffer entries, words, bytes, bits or any other appropriate representation of the corresponding amount of data.

Further, the subflow controller 58 may include a timer that may limit the maximum length of time that a subflow queue is allowed to remain in the paused state. In an embodiment, the status recorder 60 may store the current status, such as active or paused, of each subflow queue in a corresponding status variable.

The memory 62 may include one or more memory devices, including but not limited to read-only memory (ROM), random access memory (RAM), or a cache memory. In addition, the memory 62 may include one or more storage devices, including but not limited to a hard disk drive (HDD), a compact disk (CD) drive, an integral or removable solid-state memory device (SSD), or any other appropriate computer-readable storage device known in the art.

The processing device 64 may include any computer processing device capable of supporting speech recognition and data analysis. For example, in any embodiment, the processing device 64 may be implemented using a mainframe computer, a server, a desktop personal computer, a laptop computer, a notebook computer, a tablet computing device, a mobile computing device, or any other suitable computer processing device. In any embodiment, the processing device 64 may further include one or more input/output (I/O) devices, including but not limited to a monitor, a keyboard, or a pointing device; a network connection interface; as well as other integral, peripheral or accessory computer components as are known in the art.

The data links 66 may include any connective medium capable of transmitting digital data, as the specific application may require. For example, in any embodiment, the data links 66 may be implemented using any type of combination of known communications connections, including but not limited to digital data buses, a universal serial bus (USB), an Ethernet bus or cable, a wireless access point, twisted pairs of wires, or the like. In any embodiment, any portion or all of the data links 66 may be implemented using physical connections, radio frequency or wireless technology. A person of ordinary skill in the art will readily apprehend that any combination of numerous existing or future data communication technologies may be implemented in association with an embodiment of the invention.

Figure 3:
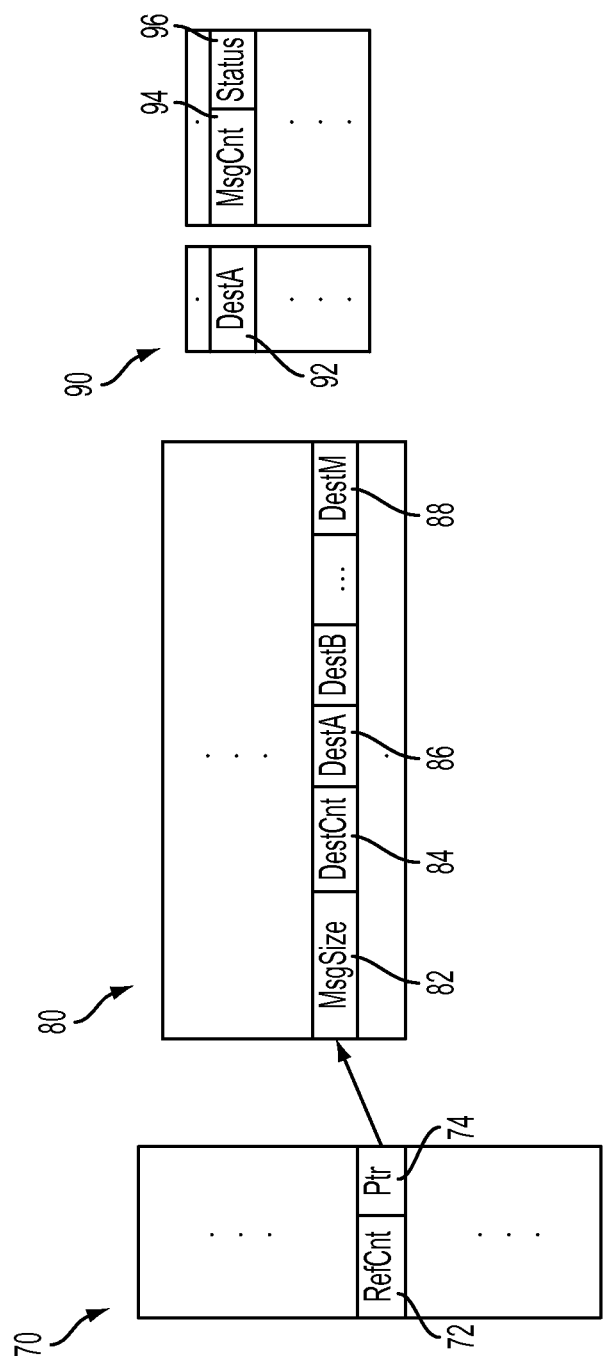
FIG. 3 is a schematic diagram of a set of data structures that may be used to implement an embodiment of the present invention.

FIG. 3 illustrates a representative set of data structures that may be used to implement an embodiment of the present invention. The data structures may be implemented by a switching device flow synchronizer, for example, by the network message flow synchronizer 50 of FIG. 2 in association with the switching device of FIG. 1. The subflow counter data structure 70 may include a reference count variable 72 and a pointer 74 corresponding to each multicast message payload currently being processed by the flow synchronizer. The reference count variable 72 may maintain the current number of subflows at any time that remain to send the corresponding message payload to a destination or output port. The pointer 74 may store the location of the corresponding entry for the message in the subflow tracker data structure 80.

A person of ordinary skill in the art will understand that in an alternative embodiment, the reference count variable 72 may be initialized to zero and maintain the current number of subflows at any time that have sent the corresponding message payload to a destination or output port. In this case, the number-ahead variable may be decremented when the subflow counter reaches the total number of subflow queues that must send the message.

The subflow tracker data structure 80 may store an entry corresponding to each multicast message is currently being processed, including a message size variable 82, a connection count variable 84, and a list of destinations, for example, destination A 86 through destination M 88. The message size variable 82 may store the size of the corresponding message, for example, the number of replication buffer entries, words, bytes, or bits required to store the message payload, or any other appropriate representation of the corresponding amount of data. The connection count variable 84 may store the number of destinations, or output ports, to which each message payload has been forwarded at any given time. The list of destinations 86, 88, may store the individual identification of each destination or output port to which the payload has been forwarded.

A person of ordinary skill in the art will understand that in alternative embodiments the subflow counter data structure 70 and subflow tracker data structure 80 may be integrated in a single data structure or may be divided into more than two data structures. In a preferred embodiment, the designed number of rows in the subflow counter data structure 70 is the same as the number of payload buffers. The number and size of buffers may depend on the design capacity, for example, 256-byte buffers may be used to store Ethernet frames/packets. On the other hand, the number of subflow tracker data structure 80 rows in a preferred embodiment may equal the number of multicast frames required to meet a capacity target.

The message counter data structure 90 may store an entry corresponding to each multicast subflow queue, such as the subflow queues 28 shown in FIG. 1. The message counter data structure 90 may include a destination identification 92 or output port destination, a number-ahead variable 94 and a status variable 96. The destination identification 92 may indicate the destination or output port corresponding to the particular subflow queue. The number-ahead variable 94 may store the current number of messages the corresponding subflow queue has sent in advance of any other subflow queue currently processing a common multicast message. The status variable 96 may store the current status, such as paused or unpaused, of the corresponding subflow queue.

In an alternate embodiment, the message counter data structure 90 may have fewer rows than the potential maximum number of connections or subflows. For example, the number of rows may be optimized to minimize required chip space while generally meeting a capacity target in order to efficiently handle the majority of cases requiring flow synchronization. In the case that the message counter data structure 90 becomes full, one or more subflows may operate without flow synchronization for a period of time until the message counter data structure 90 has extra capacity.

In an embodiment, the number-ahead variable 94 may store the greatest difference at any time between the number of messages sent by the corresponding subflow and the number of messages sent by any other subflow with one or more common multicast messages that currently lags the corresponding subflow. In alternative embodiments, the number-ahead variable 94 may store any appropriate representation of the discrepancy in the amount of corresponding data sent, such as, for example, the number of replication buffer entries, words, bytes, or bits the subflow queue has sent in advance of another subflow queue.

Referring now to FIG. 4, a flow chart illustrates a method in accordance with an embodiment of the present invention. The method may be implemented, for example, by the network message flow synchronizer 50 of FIG. 2. In block 100, a multicast message may be received, for example, an Internet protocol packet may arrive from a network at an input port of a switching device. Header information from the message, including each of the individual network destinations targeted by the multicast message, may be stored in block 102. For example, each individual destination targeted by the multicast message may be stored in a separate multicast subflow queue, or virtual output queue (VOQ), corresponding to that destination or output queue. In essence, split headers may be created for each of the copies of the multicast frame to be sent.

In block 104, the payload data from the multicast message may be stored, for example, in a replication cache at the corresponding input port interface. The payload data may be maintained in the replication cache until all processing of the multicast message has been completed by the switching device and the multicast message has been forwarded to all of the destinations indicated in the message header. In block 106, a subflow counter, including, for example, a reference count variable, may be initialized to the number of subflow queues corresponding to all of the destinations indicated in the message header. The subflow counter keeps track of the number of copies for the corresponding head payload buffer that are still being processed.

In block 108, the input port may request that dynamic connections be set up between the corresponding output ports and the destination network nodes indicated in the message header. For each connection in turn, a grant may be communicated by the output port corresponding to the destination, and received by the input port in block 110, after a dynamic connection has been set up between the switching device and the corresponding destination network node. In response to each grant in turn, the method may proceed as follows:

If the current status corresponding subflow queue is not paused in block 112, then header information from the message may be forwarded to the switching fabric, in block 114, and the subflow counter may be decremented by one (1), in block 116. Each copy of a message header information, or destination identifier, may be independently injected from the corresponding subflow queue into the switching fabric as soon the corresponding destination has granted its injection and the message is located at the head-of-line (HOL) position of its subflow queue. Thus, the subflows belonging to the same multicast flow may diverge.

Figure 4A:
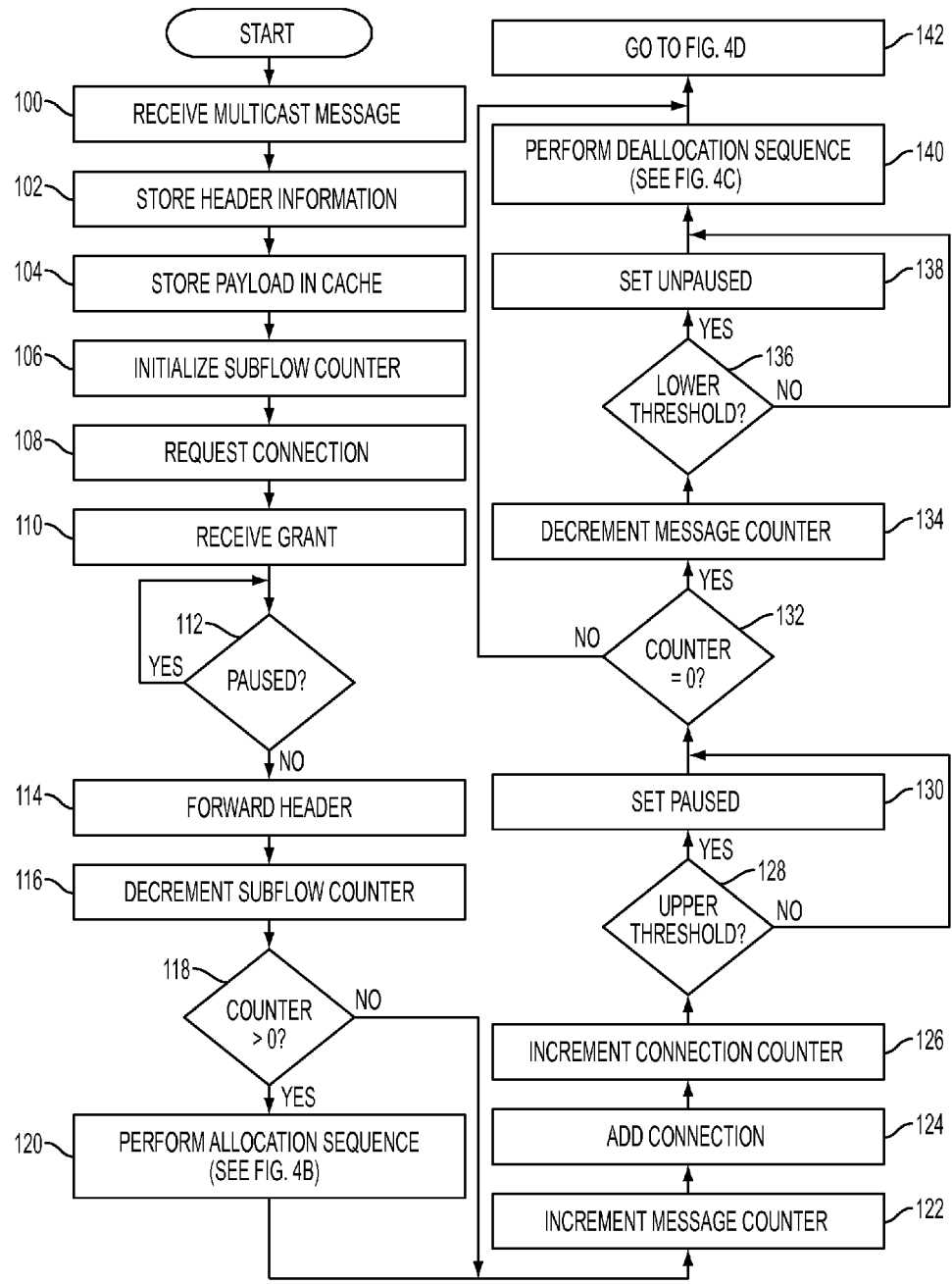
FIG. 4A is a flow diagram of a method in accordance with an embodiment of the invention.
Figure 4B:
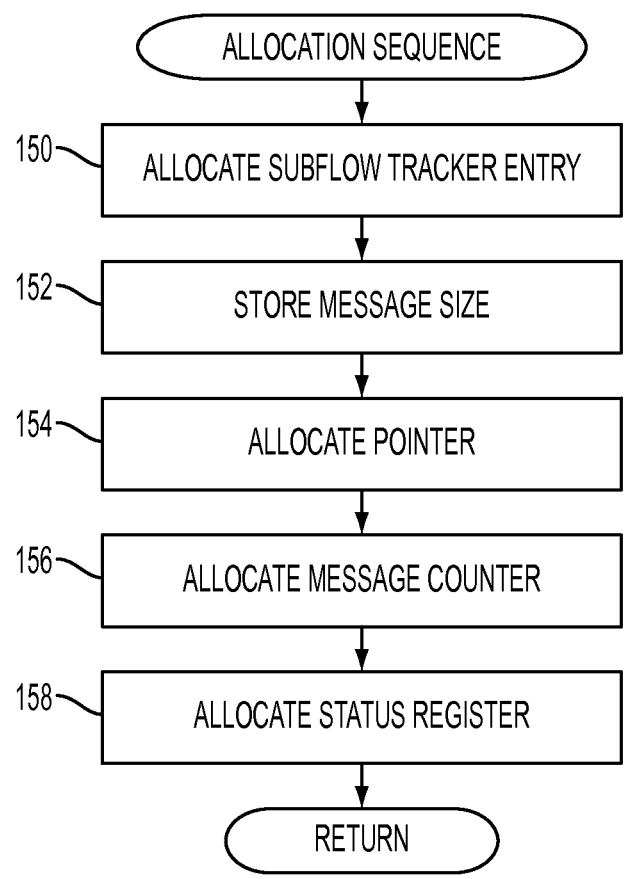
FIG. 4B is a flow diagram of a method in accordance with an embodiment of the invention.

If the subflow counter indicates that the number of subflow queues remaining to send the message is greater than zero (0), in block 118, then the allocation sequence of FIG. 4B may be performed in block 120. Referring to FIG. 4B, in block 150, if a subflow tracker entry has not yet been allocated, that is, the pointer to the subflow tracker entry does not contain a valid location, a new subflow tracker entry may be allocated.

The subflow tracker may keep track of the dynamic connections that have been sent a copy of the multicast message frame for the given head payload buffer. For example, the subflow tracker entry may include memory space to store the message size or the number of data buffers that are used for the multicast frame, a connection count indicating the number of subflow queues that have sent the message (initially zero), a list of the subflow queues that have sent the message or output ports that have been sent a copy of the message.

In an embodiment, if the subflow tracker entry allocation fails, for example, because the subflow tracker memory space is full, then the method may abort the allocation attempt and return to a failsafe default location and continue, for example, at block 112. In this case, the corresponding multicast message may be processed without flow synchronization.

In block 152, the message size may be stored in the subflow tracker, that is, the amount of memory space allocated to store the message payload data, or frame, may be represented in any appropriate units of data, such as buffer entries, words, bytes, bits, or the like, if the message size has not previously been allocated. In block 154, the location of the subflow tracker entry may be stored in the appropriate pointer entry corresponding to the subflow queue, if the entry does not yet contain a valid location.

If not previously allocated, and the pointer to the corresponding subflow tracker entry contains a valid location, a message counter may be allocated for the corresponding subflow queue and initiated to zero, in block 156. The message counter field may hold the number of messages or data buffers that have been sent for this destination for multicast frames where not all copies have been sent. In block 158, a status register may be allocated for the corresponding subflow queue. The status field may indicate whether or not the corresponding subflow queue is currently paused.

In an embodiment, if the message counter allocation fails because the subflow tracker memory space is full, then the method may abort the allocation attempt and return to a failsafe default location and continue, for example, at block 112. In this case, the corresponding subflow queue may continue without flow synchronization.

Returning to FIG. 4, the message counter may be incremented by one (1), or alternatively, by the message size, in block 122. The destination or output port corresponding to the granted connection may be added to the list of subflow queues, or connections, that have sent the message, in block 124. If a corresponding connection counter does not yet exist, a connection counter may be initialized, and in any case, the connection counter may be incremented, in block 126.

If the quantity indicated by the message counter, in block 128, is equal to or greater than a predetermined upper threshold, the corresponding subflow queue status may be set to pause, in block 130, and the subflow may be inactivated such that further messages are not forwarded to the switching fabric by that subflow while the status is paused. Thus, a subflow queue may be blocked from sending new messages while the remaining subflows that hold messages from the same multicast message lag too far behind.

If, on the other hand, the quantity indicated by the message counter, in block 128, is less than the upper threshold, or in any case after the subflow queue has been paused, in block 130, then the method may continue at block 132. If the subflow counter indicates that the number of subflow queues remaining to send the message currently equals zero (0), in block 132, and the pointer to the subflow tracker entry contains a valid location, then the message counter may be decremented by one (1), or alternatively, by the message size, in block 134.

If the quantity indicated by the message counter, in block 136, is equal to or lower than a predetermined lower threshold, the corresponding subflow queue status may be set to unpaused or active, in block 138, and the subflow may be allowed to continue to forward messages to the switching fabric. Otherwise, if the quantity indicated by the message counter, in block 136, is greater than the lower threshold, and the subflow queue status currently is not set to pause, or in any case after the subflow queue has been unpaused in block 138, then the deallocation sequence of FIG. 4C may be performed, in block 140.

Figure 4C:
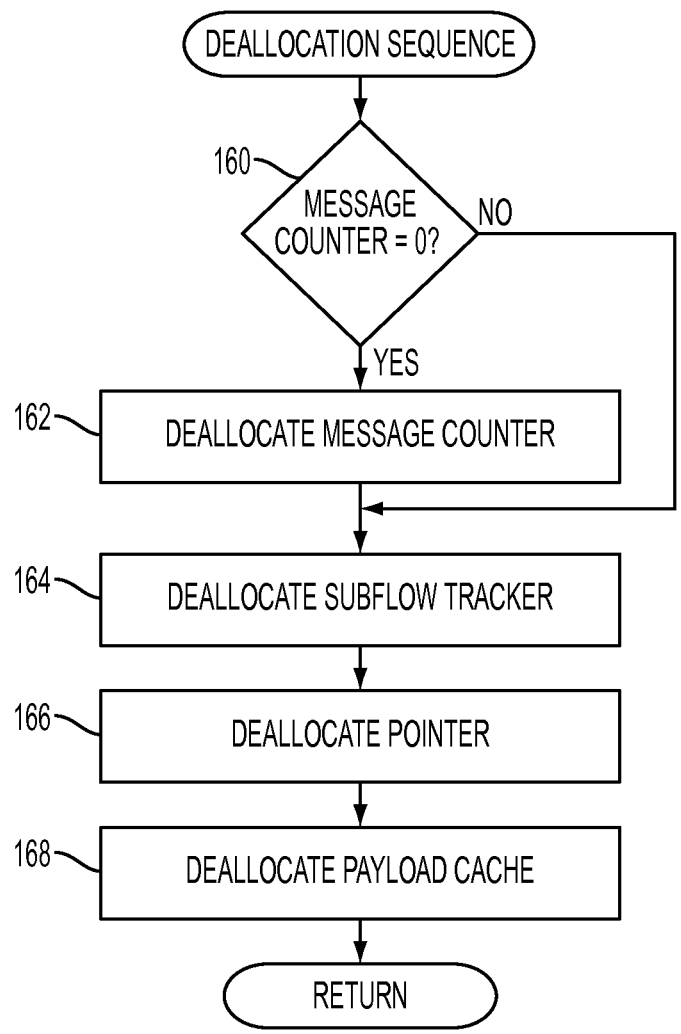
FIG. 4C is a flow diagram of a method in accordance with an embodiment of the invention.

Referring to FIG. 4C, if the quantity indicated by the message counter is equal to zero (0), in block 160, and the corresponding subflow queue is not paused, then the message counter may be deallocated, in block 162. Otherwise, if the message counter indicates zero (0), in block 160, or in any case after the message counter has been deallocated, in block 162, then the corresponding subflow tracker entry may be deallocated, in block 164, and the corresponding memory space may be free for assignment to another entry.

In addition, the corresponding pointer may be deallocated, in block 166, and the corresponding payload cache may be deallocated, in block 168, and the corresponding memory space may be freed for reassignment. The flow synchronization logic may determine when the last multicast copy of a message has been processed, and the corresponding message cache entry can be freed as soon as all the headers have been transferred through the crossbar to their destinations. In block 170, the method flow path may return to FIG. 4A and continue. Referring to FIG. 4A, if the subflow counter indicates that the number of subflow queues remaining to send the message is greater than zero (0), in block 132, or in any case after performing the deallocation sequence of FIG. 4C, in block 140, then the method may continue in FIG. 4D (see block 142).

Figure 4D:
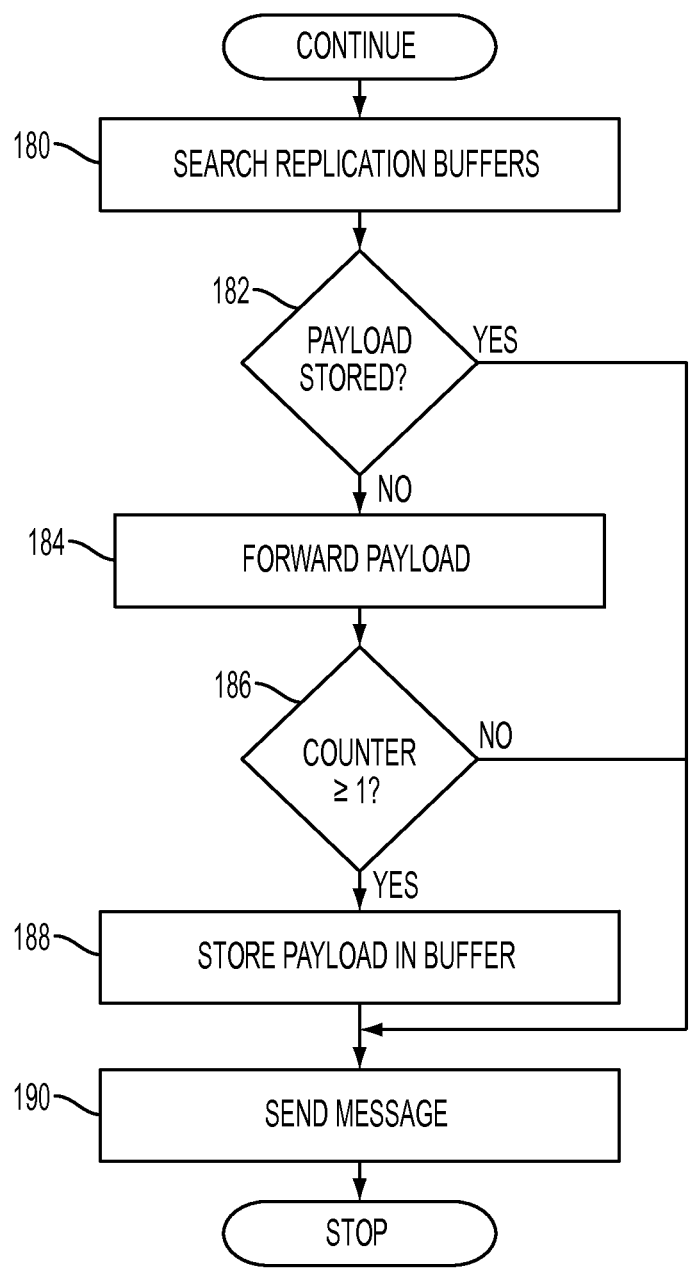
FIG. 4D is a flow diagram of a method in accordance with an embodiment of the invention.

Referring to FIG. 4D, the replication buffers located in the switching fabric may be searched for the message payload data corresponding to the message header (forwarded to the switching fabric in block 114 of FIG. 4A). If, in block 182, the payload data is not found in the replication buffers located in the switching fabric, then the payload data may be forwarded to the switching fabric from the replication cache at the input port, in block 184. If the subflow counter indicates that the number of subflow queues remaining to send the message is equal to or greater than one (1), in block 186, then the payload data may be stored in a replication buffer in the switching fabric, in block 188.

Otherwise, if the payload data is found in the replication buffers located in the switching fabric, in block 182, or if the subflow counter indicates that the number of subflow queues remaining to send the message is equal to zero (0), in block 186, or in any case after storing payload data has been stored in the replication buffer, in block 188, the message may be sent to the destination or output port, in block 190.

While the header information for each copy is forwarded independently of other copies, it is still possible to avoid sending the same message payload multiple times, because the switching fabric may store the payloads from a number of multicast messages in internal buffers. When a source port finds that the payload of a multicast message is stored inside the fabric, the corresponding queue may forward the message header information, or destination identifier, and instruct the switching fabric to send a create a replica of the stored payload to send to the destination, or output port, indicated by the header.

Generally, payload data from a multicast message may be stored in the replication buffer, that is, in the switching fabric, until the message has been sent to all destinations indicated in the original multicast message header, that is, until all corresponding subflow queues have forwarded the header information. However, payload data may be stored in the replication buffer until there is no more space in the replication buffer, that is, until the replication buffer overflows, in which case the payload data may be replaced by that of a subsequently forwarded message. In this case, the replaced payload data will need to be forwarded once again from the input port to the switching fabric.

The flow synchronization system and method disclosed herein has been implemented in a multiple-rack multicast tree resulting in substantial throughput improvement. For example, the effective bandwidth more than doubled for a multicast source message targeting 639 destinations distributed in a four-rack multicast tree using flow synchronization, compared to the same system without flow synchronization.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for synchronizing multicast message subflows in a switched network, comprising:
storing, to a payload replication buffer, a payload packet corresponding to a multicast message internal to a switching fabric of a switching device, wherein a pointer to a memory location of the payload packet is stored in a multicast header associated with the multicast message;
associating, with a processing device, a first destination identifier corresponding to the multicast message with a first queue that corresponds to a first output port of the switching device;
associating, with a processing device, a second destination identifier corresponding to the multicast message with a second queue that corresponds to a second output port of the switching device; and
facilitating flow synchronization for the first queue and the second queue to prevent an overload of the payload replication buffer, wherein the flow synchronization comprises
incrementing a subflow counter and a message counter when the first queue forwards a message to a destination;
decrementing the subflow counter when the first queue and the second queue have each forwarded at least one message;
pausing transmission of the multicast message by the first queue in response to the subflow counter crossing a first predetermined threshold, wherein the transmission of the multicast message by the first queue is paused when the second queue is determined to be behind by the first queue in message transmissions by a predetermined threshold based on the subflow counter; and
unpausing the first queue in response to the subflow counter crossing a second predetermined threshold, wherein the subflow counter crossing the second predetermined threshold is indicative that the second queue is within a predetermined range of the first queue for messages transmitted, wherein transmission of the multicast message by the first queue comprises forwarding the multicast header associated with the multicast message to the switching fabric that will use the pointer in the multicast header to forward a stored payload in the payload replication buffer to the first destination identifier.

2. The method of claim 1, further comprising:
incrementing the message counter in response to the first queue forwarding the destination identifier;
adjusting the subflow counter corresponding to the multicast message in response to the first queue forwarding the destination identifier, wherein the subflow counter indicates a number of queues associated with the multicast message; and
decrementing the message counter in response to the subflow counter indicating that all queues associated with the multicast message have forwarded the destination identifier.

3. The method of claim 2, further comprising:
initializing the message counter to zero; and
initializing the subflow counter to an initial number of queues with which the destination identifier is associated, wherein adjusting the subflow counter includes decrementing the subflow counter, and the subflow counter indicates a current number of queues associated with the multicast message that remain to forward the destination identifier.

4. The method of claim 1, further comprising:
receiving at least a portion of the multicast message at an input port associated with the switching device; and
storing payload data corresponding to the multicast message in a replication buffer associated with the switching fabric of the switching device.

5. The method of claim 4, wherein the first queue and the second queue further correspond to the input port.

6. The method of claim 4, further comprising:
forwarding the destination identifier to the switching fabric;
replicating at least a portion of the payload data corresponding to the multicast message from the replication buffer; and
sending the replicated payload data via the output port.

7. The method of claim 4, wherein the first predetermined threshold is greater than a total size of the replication buffer.

8. The method of claim 1, wherein the first queue is associated with a plurality of destination identifiers corresponding to a plurality of network messages.

9. The method of claim 8, wherein the first queue forwards destination identifiers on a first-in-first-out basis using a request-grant protocol.

10. A system for synchronizing multicast message subflows in a switched network, comprising:
a switching device configured to
store, to a payload replication buffer, a payload packet corresponding to a multicast message internal to a switching fabric of the switching device, wherein a pointer to a memory location of the payload packet is stored in a multicast header associated with the multicast message,
associate a first destination identifier corresponding to the multicast message with a first queue that corresponds to a first output port of the switching device, and
associate a second destination identifier corresponding to the multicast message with a second queue that corresponds to a second output port of the switching device;
a subflow controller configured to facilitate flow synchronization for the first queue and the second queue to prevent an overload of a payload replication buffer, wherein the flow synchronization comprises
incrementing a subflow count and a message count when the first queue forwards a message to a destination;
decrementing the subflow count when the first queue and the second queue have each forwarded at least one message;
pausing transmission of the multicast message by the first queue in response to the subflow count crossing a first predetermined threshold, wherein the transmission of the multicast message by the first queue is paused when the second queue is determined to be behind by the first queue in message transmissions by a predetermined threshold based on the subflow count, and
unpausing transmission of the multicast message by the first queue in response to the subflow count crossing a second predetermined threshold, wherein the subflow count crossing the second predetermined threshold is indicative that the second queue is within a predetermined range of the first queue for messages transmitted wherein transmission of the multicast message by the first queue comprises forwarding the multicast header associated with the multicast message to the switching fabric that will use the pointer in the multicast header to forward the stored payload in the payload replication buffer to the first destination identifier.

11. The system of claim 10, further comprising:
a message counter configured to increment the message count in response to the first queue forwarding the destination identifier, wherein the message count is a number-ahead variable; and
a subflow counter configured to adjust the subflow count corresponding to the multicast message in response to the first queue forwarding the destination identifier, wherein the reference count indicates a number of queues associated with the multicast message, and the message counter is further configured to decrement the message count in response to the subflow counter indicating that all queues associated with the multicast message have forwarded the destination identifier.

12. The system of claim 11, wherein the message counter is further configured to initialize the message count to zero, the subflow counter is further configured to initialize the subflow count to an initial number of queues with which the destination identifier is associated, adjusting the subflow counter includes decrementing the subflow count, and the subflow count indicates a current number of queues associated with the multicast message that remain to forward the destination identifier.

13. The system of claim 10, wherein the switching device is further configured to receive at least a portion of the multicast message at an input port, and store payload data corresponding to the multicast message in a replication buffer associated with the switching fabric.

14. The system of claim 13, wherein the switching device is further configured to forward the destination identifier to the switching fabric, replicate at least a portion of the payload data corresponding to the multicast message from the replication buffer, and send the replicated payload data via the output port.

15. The system of claim 13, wherein the first predetermined threshold is greater than a total size of the replication buffer.

16. The system of claim 10, wherein the first queue is associated with a plurality of destination identifiers corresponding to a plurality of network messages, and the subflow controller is further configured to forwards destination identifiers on a first-in-first-out basis using a request-grant protocol.

17. A computer program product for synchronizing multicast message subflows in a switched network, the computer program product comprising:
a non-transitory computer readable storage medium having program code embodied therewith, the program code executable by a computer to implement:
storing, to a payload replication buffer, a payload packet corresponding to a multicast message internal to a switching fabric of a switching device, wherein a pointer to a memory location of the payload packet is stored in a multicast header associated with the multicast message;
associating a first destination identifier corresponding to the multicast message with a first queue that corresponds to a first output port of the switching device;

associating, with a processing device, a second destination identifier corresponding to the multicast message with a second queue that corresponds to a second output port of the switching device;

facilitating flow synchronization for the first queue and the second queue to prevent an overload of the payload replication buffer, wherein the flow synchronization comprises incrementing a subflow counter and a message counter when the first queue forwards a message to a destination;

decrementing the subflow counter when the first queue and the second queue have each forwarded at least one message;

pausing transmission of the multicast message by the first queue in response to the subflow counter crossing a first predetermined threshold, wherein the transmission of the multicast message by the first queue is paused when the second queue is determined to be behind by the first queue in message transmissions by a predetermined threshold based on the subflow counter; and unpausing transmission of the multicast message by the first queue in response to the subflow counter crossing a second predetermined threshold, wherein the subflow counter crossing the second predetermined threshold is indicative that the second queue is within a predetermined range of the first queue for messages transmitted, wherein transmission of the multicast message by the first queue comprises forwarding the multicast header associated with the multicast message to the switching fabric that will use the pointer in the multicast header to forward a stored payload in the payload replication buffer to the first destination identifier.

18. The computer program product of claim 17, wherein the program code is further executable by a computer to implement:

incrementing the message counter in response to the first queue forwarding the destination identifier;

adjusting the subflow counter corresponding to the multicast message in response to the first queue forwarding the destination identifier, wherein the subflow counter indicates a number of queues associated with the multicast message; and decrementing the message counter in response to the subflow counter indicating that all queues associated with the multicast message have forwarded the destination identifier.

19. The computer program product of claim 18, wherein the program code is further executable by a computer to implement:

initializing the message counter to zero; and initializing the subflow counter to an initial number of queues with which the destination identifier is associated, wherein adjusting the subflow counter includes decrementing the subflow counter, and the subflow counter indicates a current number of queues associated with the multicast message that remain to forward the destination identifier.

20. The computer program product of claim 17, wherein the program code is further executable by a computer to implement:

receiving at least a portion of the multicast message at an input port associated with the switching device;

storing payload data corresponding to the multicast message in a replication buffer associated with the switching fabric of the switching device;

forwarding the destination identifier to the switching fabric;

replicating at least a portion of the payload data corresponding to the multicast message from the replication buffer; and sending the replicated payload data via the output port.

\* \* \* \* \*